Figure 1:
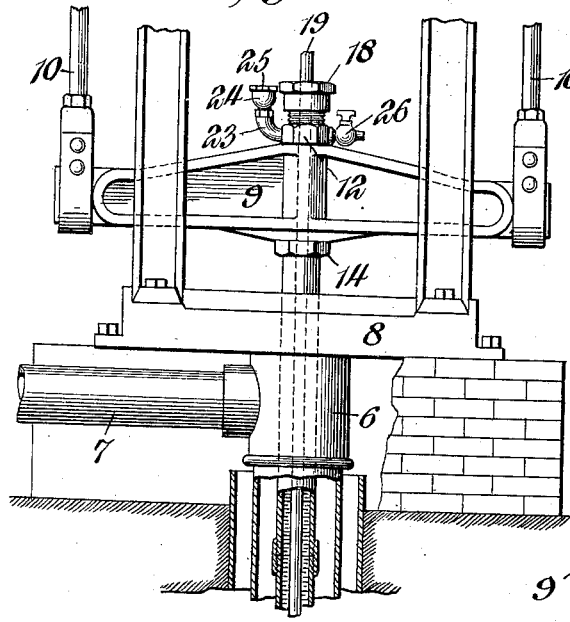

R. M. DOWNIE.
OILING DEVICE FOR PUMPS.
APPLICATION FILED FEB. 28, 1911.

991,281.

Patented May 2, 1911.

2 SHEETS—SHEET 1.

Robert M. Downie, INVENTOR,

BY

ATTORNEY

WITNESSES

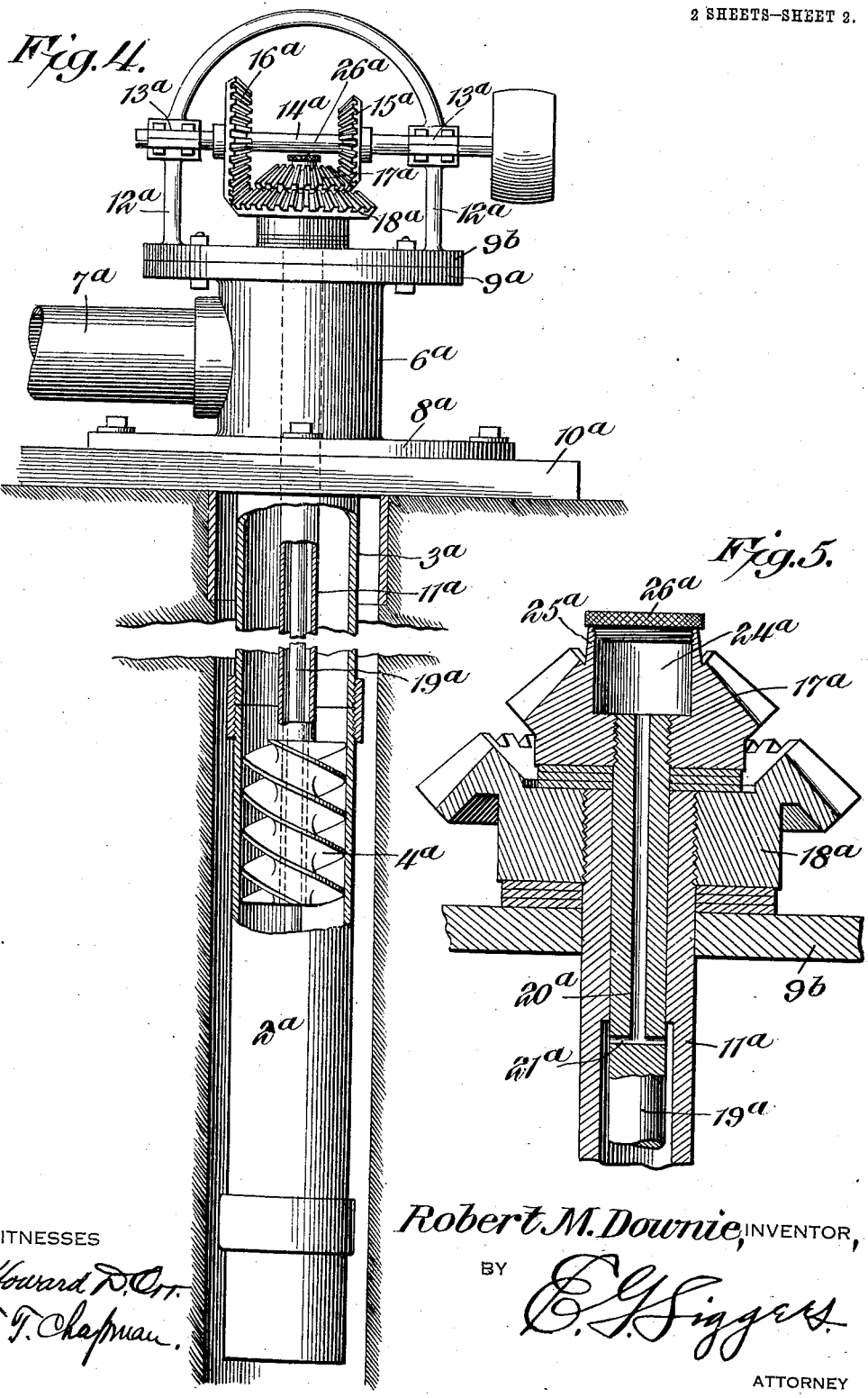

UNITED STATES PATENT OFFICE.

ROBERT M. DOWNIE, OF BEAVER FALLS, PENNSYLVANIA, ASSIGNOR TO KEYSTONE DRILLER COMPANY, OF BEAVER FALLS, PENNSYLVANIA, A CORPORATION OF PENNSYLVANIA.

OILING DEVICE FOR PUMPS.

991,281.  Specification of Letters Patent.  Patented May 2, 1911.

Application filed February 28, 1911. Serial No. 611,424.

*To all whom it may concern:*

Be it known that I, ROBERT M. DOWNIE, a citizen of the United States, residing at Beaver Falls, in the county of Beaver and State of Pennsylvania, have invented a new and useful Oiling Device for Pumps, of which the following is a specification.

This invention has reference to improvements in oiling devices for deep well pumps, and its object is to provide for the proper lubrication of the sucker rods of deep wells, especially when a sucker rod extends through tubing of a diameter where the rod is liable to come into contact with the inner walls of the tubing, thus producing friction and wear.

In deep wells the pump cylinder may be placed some hundreds of feet below the surface, and especially in double acting pumps there is a solid sucker rod working inside of a hollow sucker rod and both rods are simultaneously moving, in operation, in opposite directions. At the lower ends the rods pass freely one through the other, while at the upper ends, at the pump head, the inner rod passes through a stuffing box carried by the hollow rod. When the pump is in operation there is more or less liability of engagement between the inner pump rod or its couplings and the inner wall of the hollow pump rod surrounding it, so that there is more or less friction and corresponding wear.

In accordance with the present invention provision is made for filling the space around the solid sucker rod, within the hollow sucker rod, with lubricant in liquid form, which lubricant may be any good lubricating oil. For this purpose the body of the stuffing box into which the upper end of the hollow sucker rod is tapped is provided with an inlet and an outlet in non-interfering relation with the stuffing box gland and nut, and to the inlet there is attached an oil cup through which lubricating oil may be introduced into the upper end of the hollow sucker rod, while to the outlet passage there is attached a pet cock or other suitable means whereby air within the hollow rod may be released while oil is flowing into the space between the two rods to fill such space. The initial filling of the free space within the hollow rod may take several gallons of oil, especially in wells of several hundred feet depth, but after the initial filling a small quantity of oil added from time to time will be found sufficient to maintain the supply.

The invention will be best understood from a consideration of the following detailed description taken in connection with the accompanying drawings forming a part of this specification, with the understanding, however, that while the showing of the drawings is that of a commercial embodiment of the invention, the latter is not confined to the exact showing of the drawings or the particular association of parts there illustrated, but is susceptible of other embodiments and may be used in other relations, so that the invention is not confined to the showing of the drawings, but may be modified in various ways so long as the salient features of the invention are retained.

Figure 2:
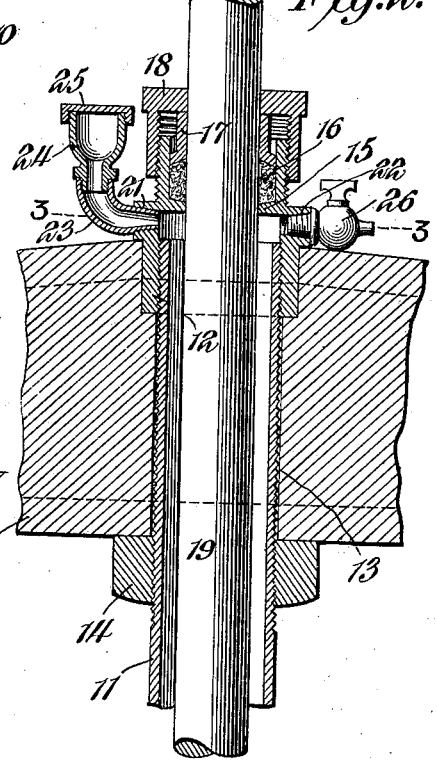
Figure 3:
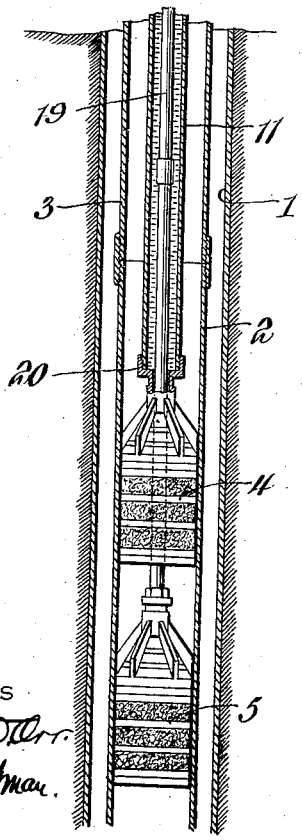
Figure 3:
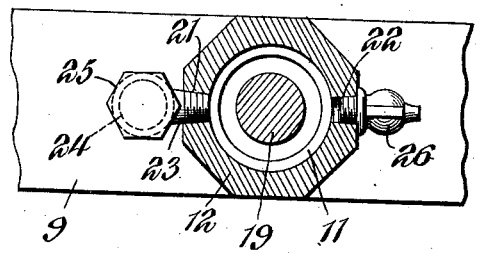

Referring to the drawings:—Figure 1 is a longitudinal section of a deep well pump showing a sufficient portion of a pumping head to illustrate the operation of the invention. Fig. 2 is an enlarged longitudinal section of the upper end of the hollow sucker rod with the solid sucker rod traversing the same and showing one of the operating cross heads of the pumping mechanism. Fig. 3 is a section on the line 3—3 of Fig. 2. Fig. 4 is an elevation with parts in longitudinal diametric section of a pump of another type than shown in Fig. 1 with the invention applied. Fig. 5 is a longitudinal diametric section of a portion of the head of the pump shown in Fig. 4 but drawn to a larger scale.

Referring to the drawings, there is shown a well casing 1, which may be taken as typical of any suitable deep well, usually not exceeding five or six hundred feet in depth, but which may exceed such depth to any extent found necessary under special circumstances, or the depth may be materially less than five or six hundred feet and still come within the range known as a deep well.

Within the well casing 1 there is shown a pump cylinder 2 which may be assumed to be of appropriate length, it being customary to use pump cylinders of different lengths for different wells, and this cylinder is carried by a tubing 3 extending to the top of the well and usually of larger internal diameter than the internal diameter of the pump cylinder 2, so that pump pistons 4, 5, respectively, the illustrating being of a double acting pump, may be readily withdrawn from the well without the necessity of removing the tubing 3 and the pump cylinder 2. The tube 3 is hung from a tee 6 from which leads a pipe 7 for conveying the pumped water to any point of disposal and the tee 6 is suspended by a suitable framing 8 which may be taken as typical of any pump head framing, and since the parts so far described may take a great variety of forms differing from the specific examples shown it is to be understood that the particular showing of the drawings is not intended to limit the use of the invention in any manner whatsoever, since other arrangements of parts may be used with facility.

The pump head in the particular construction shown is provided with a cross head 9, to which reciprocatory movement is imparted in the direction of the length of the well casing by pitmen 10 driven by suitable mechanism. The cross head 9 carries a hollow sucker rod 11 which may consist of tubing or piping of appropriate diameter screwed at the upper end into a stuffing box 12 seated in a suitable cavity formed in the cross head 9 at one end of a passage 13 therethrough, and the sucker rod 11 is clamped to the cross head by a lock nut 14 applied to the sucker rod below the said cross head. The stuffing box has at an intermediate point an inwardly directed web 15 forming a seat for packing 16 retained in place by a gland 17 and a stuffing box nut 18 and through the stuffing box there extends another sucker rod 19 which may be a simple solid rod made up of suitable lengths coupled together, as is customary, the rod 19 moving through the stuffing box in non-leaking relation thereto. The hollow sucker rod 11 is continued through the tubing 3 into the pump cylinder 2 and there carries the pump plunger or piston 4 by a reducing coupling 20, while the solid sucker rod 19 extends loosely through the reducing coupling 20 and through the plunger or piston 4 and at its lower end carries the plunger or piston 5. It will be understood, of course, that the pistons and pump cylinder are supplied with appropriate valves which, however, do not form part of the present invention, and so no further mention thereof need be made.

The stuffing box 12 has a peripheral hexagonal flange as is customary for the application of a wrench, and through this flange are formed threaded passages 21, 22, respectively, these passages being preferably diametrically opposite, but may be otherwise arranged, if desired, and both passages lead to the interior of the stuffing box, so as to be in free communication with the interior of the hollow sucker rod 11.

Screwed into the passage 21, which is tapped for the purpose, is an elbow 23 carrying at its outer end an oil cup 24 provided with a screw cap 25 usually applied to such oil cups, and the passage 22 has screwed therein a valve 26 which may be in the form of a pet cock. The cup 24 constitutes a funnel whereby lubricating oil may be introduced into the sucker rod while the pet cock 26 provides a means for the escape of air from the hollow sucker rod while the lubricating oil is being poured thereinto, and by placing the inlet for the oil on one side of the solid sucker rod and the outlet for the air on the other side there is no likelihood of the incoming oil finding escape through the air cock during the filling of the sucker rod 11. A sufficient quantity of oil is introduced into the sucker rod 11 to fill it to, or practically to the top, the pressure of water at the lower end of the rod preventing any escape of oil at that point, and, moreover, the specific gravity of the oil is less than that of water and consequently the oil will not sink in the water. When the sucker rod is filled to the desired extent, the cap 25 is placed on the cup 24 and the pet cock 26 is closed and the only leakage that will occur is by the packing 16. Practice has shown that the sucker rod 11 will contain several gallons of lubricating oil, depending, of course, upon the length and diameter of such sucker rod, while the waste of the lubricating oil which may occur by the packing 16 is so small that the occasional addition of, say, a quart of lubricating oil is all that is necessary to maintain the supply practically constant. The completion of the filling of the sucker rod 11 with oil is readily ascertained by the outflow of oil through the pet cock 26 and it is preferred that the quantity of oil introduced into the rod 11 be sufficient to completely fill it and that the supply be replenished at sufficiently frequent intervals, say every week or two, to maintain the level of the oil in the sucker rod close to the packing gland at the upper end of the sucker rod 11. By this means a solid sucker rod 9 is at all times bathed in lubricant and is thoroughly lubricated at its bearings and at any point at which it may at any time come into engagement with the inner walls of the sucker rod 11. Both sucker rods have individual longitudinal movement and such movement of the two sucker rods is in opposite directions, the length of stroke of some pumps reaching as much as forty-eight inches.

While the foregoing description has been confined to a reciprocating pump, the invention may be applied to a pump of the rotary type, such as shown in Figs. 4 and 5, wherein there is provided a pump cylinder 2ª carried by a tubing 3ª and within the pump cylinder are rotatable water lifting devices of which only one is shown in the form of a worm 4ª. At the top of the well there is provided a tee 6ª with an outlet pipe 7ª and this tee is formed with heads 8ª and 9ª, respectively, the head 8ª resting upon a suitable support 10ª for upholding it. The head 9ª carries a base plate 9ᵇ on which are erected standards 12ª carrying journal bearings 13ª for a drive shaft 14ª, which latter has fast thereon bevel gear wheels 15ª and 16ª, respectively, meshing with respective bevel gear wheels 17ª and 18ª, the gear wheel 18ª resting on the base plate 9ª and the gear wheel 17ª resting on the gear wheel 18ª in axial relation thereto.

The gear wheel 18ª carries a hollow pump rod 11ª, the top end of which extends through the plate 9ᵇ and may be screwed into the gear wheel 18ª or otherwise fastened thereto. This hollow rod 11ª at its upper end is reduced in diameter for the passage of a solid pump rod 19ª, which latter, however, where passing through the reduced end of the hollow rod 11ª is formed with a longitudinal axial passage 20ª extending from its upper end which may be screwed into the gear wheel 17ª to a point below the upper end of the larger portion of the interior of the hollow rod 11ª and there the passage 20ª is formed with lateral branches 21ª opening into the interior of the rod 11ª. The end of the bevel gear 17ª remote from that entered by the rod 19ª is formed with a chamber 24ª to constitute an oil cup or funnel, the bevel gear about said chamber being also formed with an outstanding annular flange 25ª internally threaded to receive a cap 26ª.

The two pump rods extend to the pump cylinder 2ª and the hollow pump rod carries at its lower end the worm 4ª and is open at the lower end of the worm to the extent that it need not there fit tightly about the solid rod 19ª.

If it be assumed that the water level in a well in which the pump just described is installed is at no great distance above the pump cylinder, then, of course, the water will enter the hollow rod 11ª to a commensurate height and will form a water seal for lubricating oil introduced into the hollow rod through the cup 24ª from which it may flow through the passage 20ª and branch passages 21ª into the interior of the hollow rod 21ª until this hollow rod may be filled with lubricant. While in the particular form of pump just described the rods have a relative rotation one to the other in opposite directions whether the rods both rotate, or whether one rod only rotates, it will be seen that in deep wells there is liability of the solid rod coming in contact with the inner wall of the hollow rod, and under such circumstances there will be more or less wear. However, if the solid rod be bathed in lubricating oil all the parts are well lubricated and wear is practically eliminated or reduced to nearly a negligible minimum. Should it become necessary, the lubricant within the hollow rod may have fresh lubricant added thereto from time to time by the removal of the cap 26ª and the pouring of additional lubricant in the cup 24ª, but as the interior of the hollow rod is practically hermetically sealed, the seal at the bottom being due to the water and at the top to the cap 26ª, or, in the case of the structure of Fig. 1, by the water seal at the bottom and the stuffing box, cap 25 and pet cock 26 at the upper end, the supply of lubricant will last for long periods of time and lubrication need be only at infrequent intervals. The showing of the rotary pump is intended to be simply indicative in the present application of any type of rotary pump so that the applicability of the invention to different types of pumps may be made manifest.

What is claimed is:—

1. A double acting deep well pump provided with a hollow sucker rod and another sucker rod interior thereto and extending longitudinally thereof, the first named sucker rod being provided with a packing gland at the upper end traversed by the inner sucker rod, means for the introduction of liquid lubricant into the hollow sucker rod at will, and means for permitting the escape of air from the hollow sucker rod on the introduction of the lubricant thereinto.

2. A double acting deep well pump provided with a hollow sucker rod and another sucker rod interior thereto and extending at both ends through the corresponding ends of the hollow sucker rod, a packing means at the upper end of the hollow sucker rod for the longer sucker rod, and an oil inlet and air outlet means communicating with the interior of the hollow sucker rod below the packing means, said oil inlet and air outlet means being operable at will to open or close communication with the interior of the sucker rod.

3. A double acting deep well pump provided with a hollow sucker rod having at the upper end a packing gland, another sucker rod interior to the first named sucker rod and of greater length and extending at each end beyond the corresponding end of the hollow sucker rod, the inner sucker rod traversing the packing gland at the upper end of the first named sucker rod, an inlet conduit communicating with the interior of the hollow sucker rod through the packing gland structure and provided with means for closing said communicating means to the introduction of lubricant at will, and an air valve also communicating with the interior of the hollow sucker rod through the packing gland structure, said air valve being operable at will to open the interior of the hollow sucker rod to the atmosphere for the escape of air or to close the interior of the hollow sucker rod against the escape of the contents thereof.

4. A deep well pump provided with a hollow pump rod and another pump rod interior thereto and extending longitudinally thereof, the hollow rod being normally sealed at both ends, and means at the accessible end of the pump for the introduction of lubricant into the hollow rod to substantially fill the latter.

5. A double acting deep well pump provided with a hollow sucker rod and another sucker rod interior thereto and extending longitudinally thereof, the first named sucker rod being provided with a packing gland at the upper end traversed by the inner sucker rod, and the said hollow sucker rod being, when installed, water sealed at the lower end, and means for the introduction of liquid lubricant into the hollow sucker rod at will.

6. A deep well pump provided with a conduit for the liquid to be pumped, a hollow and a solid rod lodged in the conduit for the pumped liquid with the solid rod interior to the hollow rod, and means for the introduction of a bath of liquid lubricant in the hollow rod to substantially fill the latter.

7. A deep well pump provided with a conduit for the liquid to be pumped, a hollow and a solid rod lodged in the conduit for the pumped liquid with the solid rod interior to the hollow rod, and means for the introduction of a bath of liquid lubricant in the hollow rod to substantially fill the latter, the hollow rod being provided at the upper end with a mechanical seal against the escape of lubricant and at the lower end extending below the water level of the well, when installed, and thereby water sealed against the escape of lubricant.

In testimony, that I claim the foregoing as my own, I have hereto affixed my signature in the presence of two witnesses.

ROBERT M. DOWNIE.

Witnesses:
J. WALKER WILSON,
JAS. M. STERRETT.

---

Copies of this patent may be obtained for five cents each, by addressing the "Commissioner of Patents, Washington. D. C."